(12) United States Patent
Martinez Tarradell et al.

(10) Patent No.: US 9,681,342 B2
(45) Date of Patent: Jun. 13, 2017

(54) ASSISTANCE INFORMATION FOR EVOLVED NODE B (ENB) PARAMETER TUNING

(71) Applicant: INTEL IP CORPORATION, Santa Clara, CA (US)

(72) Inventors: Marta Martinez Tarradell, Hillsboro, OR (US); Sangeetha L. Bangolae, Beaverton, OR (US); Candy Yiu, Beaverton, OR (US); Hyung-Nam Choi, Hamburg (DE); Puneet Jain, Hillsboro, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 73 days.

(21) Appl. No.: 14/582,373

(22) Filed: Dec. 24, 2014

(65) Prior Publication Data

US 2015/0237547 A1    Aug. 20, 2015

Related U.S. Application Data (60) Provisional application No. 61/933,877, filed on Jan. 31, 2014.

(51) Int. Cl.
*H04W 36/00* (2009.01)
*H04W 4/00* (2009.01)
(Continued)

(52) U.S. Cl.
CPC ....... *H04W 36/0088* (2013.01); *H04W 4/005* (2013.01); *H04W 24/08* (2013.01); *H04W 72/0406* (2013.01); *H04W 36/08* (2013.01)

(58) Field of Classification Search
CPC . H04W 36/0088; H04W 24/08; H04W 4/005; H04W 72/0406; H04W 36/08
See application file for complete search history.

(56) References Cited

U.S. PATENT DOCUMENTS

| 2011/0075675 A1 | 3/2011 | Koodli et al. |
| 2013/0083650 A1 | 4/2013 | Taleb et al. |

(Continued)

FOREIGN PATENT DOCUMENTS

| TW | 201345305 A | 11/2013 |
| WO | WO 2014/007816 A1 | 1/2014 |

OTHER PUBLICATIONS

3GPP; 3$^{rd}$ Generation Partnership Project; Technical Specification Group Service and Sysfem Aspects; Single Radio Voice Call Continuity (SRVCC); Stage 2; 3GPP TS 23.216 v12.0.0; Dec. 2013; 69 pages; Release 12.

(Continued)

*Primary Examiner* — Ajit Patel
(74) *Attorney, Agent, or Firm* — Thorpe North & Western (57) ABSTRACT

Technology for providing core network assistance information from a mobility management entity (MME) in an evolved packet core (EPC) is disclosed. An average radio resource control (RRC) connected state time for a UE is determined. An average RRC idle state time for the UE is also determined. An amount of time that the UE spends in cells of the EPC is identified to determine a number of handover procedures between cells in a selected time period. The core network assistance information communicated to a serving eNB of the UE to enable the serving eNB to reduce UE state transitions for the UE.

28 Claims, 5 Drawing Sheets

(51) Int. Cl.
*H04W 72/04* (2009.01)
*H04W 24/08* (2009.01)
*H04W 36/08* (2009.01)

(56) References Cited

U.S. PATENT DOCUMENTS

2014/0219150 A1* 8/2014 Lee .................. H04W 52/0206
370/311
2015/0319744 A1* 11/2015 Jung .................. H04W 24/10
370/328

OTHER PUBLICATIONS

3GPP; 3rd Generation Partnership Project; Technical Specification Group Services and System Aspects; Study on Machine-Type Communications (MTC) and other mobile data application communication enhancements; 3GPP TR 23.887 v 12.0.0; Dec. 2013; 151 pages; Release 12.

3GPP; 3rd Generation Partnership Project; Technical Specification Group Services and System Aspects; General Packet Radio Service (GPRS) enhancements for Evolved Universal Terrestrial Radio Access Network (E-UTRAN) access; 3GPP TS 23.401 v 11.0.0; Dec. 2011; 287 pages; Release 11.

3GPP; 3rd Generation Partnership Project; Technical Specification Group Services and System Aspects; General Packet Radio Service (GPRS) enhancements for Evolved Universal Terrestrial Radio Access Network (E-UTRAN) access; 3GPP TS 23.401 v 12.0.0; Mar. 2013; 290 pages; Release 12.

3GPP: 3rd Generation Partnership Project; Technical Specification Group Services and System Aspects; Telecommunication management; Subscriber and equipment trace; Trace control and configuration management; 3GPP TS 32.422 v12.0.0; 134 pages; Release 12.

3GPP; 3rd Generation Partnership Project; Technical Specification Group Services and System Aspects; 3GPP System Architecture Evolution (SAE); Security architecture; 3GPP TS 33.401 v12.5.0; Sep. 2012; 121 pages; Release 12.

3GPP; 3rd Generation Partnership Project; Techical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 v12.0.0; Dec. 2013; 208 pages; Release 12.

3GPP; 3rd Generation partnership Project; Technical Specification Group Radio Access Network; Evolved Universal Terrestrial Radio Access (E-UTRA); Radio Resource Control (RRC); Protocol specification; 3GPP TS 36.331 v11.0.0; Jun. 2010; 302 pages; Release 11.

3GPP; 3rd Generation partnership Project; Technical Specification Group Radio Access Network; Evolved Universal Terrestrial Radio Access (E-UTRA); Radio Resource Control (RRC); Protocol specification; 3GPP TS 36.331 v12.0.0; Dec. 2013; 349 pages; Release 12.

3GPP; 3rd Generation Partnership Project; Technical Specification Group Radio Access Network; Universal Terrestrial Radion Access (UTRA) and Evolved Universal Terrestrial Radio Access (E-UTRA); Radio measurement collection for Minimization of Drive Tests (MDT); Overall description; Stage 2; 3GPP TS 37.320 v11.0.0; Jun. 2012; 20 pages; release 11.

3GPP SA WG2 Meeting #99—S2-133206; Alcatel-Lucent; Core Network assisted eNode B parameters tuning; Sep. 23-27, 2013; (Release 12); Xiamen, P.R. China.

* cited by examiner

ASSISTANCE INFORMATION FOR EVOLVED NODE B (ENB) PARAMETER TUNING

RELATED APPLICATIONS

The present application claims priority to U.S. Provisional Patent Application No. 61/933,877, filed Jan. 31, 2014, the entire specification of which is hereby incorporated by reference in its entirety for all purposes.

BACKGROUND

Machine type communication (MTC) is a communication that does not typically require human intervention. The advent of machine type communication has brought about a new set of use cases for wireless standards and wireless communications systems. Wireless devices used for MTC or MTC applications typically have similar characteristics. For example, MTC devices typically have low mobility, low priority, and send small amounts of mobile originated and/or mobile terminated data. The data is typically sent very infrequently, such as once a week, or once a month. Alternatively, some types of MTC devices are configured to send relatively small amounts of MTC data more frequently. In order to send the data more frequently, an efficient means of connecting and disconnecting the MTC device to a wireless network would be useful to reduce the impact that frequent connections and disconnections has on the wireless network.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Figure 1:
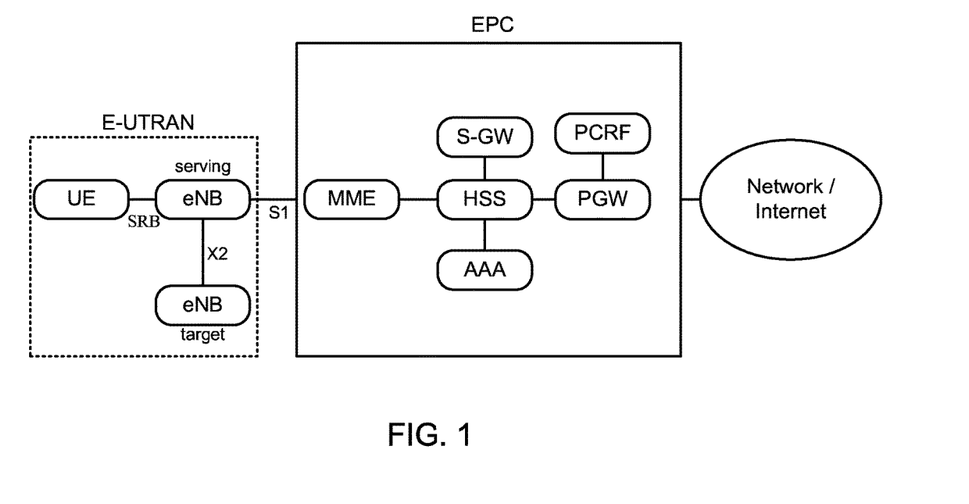
FIG. 1 illustrates an evolved Universal Mobile Telecommunications System (UMTS) Terrestrial Radio Access Network (e-UTRAN) in communication with an Evolved Packet Core (EPC) in accordance with an example.

FIG. 1 is an example block diagram of an UE 102 in wireless communication with an evolved packet system (EPS) comprising one or more eNodeBs 104 that are in communication with an evolved packet core (EPC) in accordance with the 3GPP LTE Release 8, 9, 10, 11, 12 or 13. The EPC can comprise a mobility management entity (MME). The MME can be configured to handle the control plane communication for each UE. The control plane signaling provides mobility and security for access for the UE to the evolved Universal Mobile Telecommunications System (UMTS) Terrestrial Radio Access Network (E-UTRAN).

A Radio Resource Control (RRC) protocol layer is a sublayer that exists between the user equipment (UE) and the evolved Node B (eNB) in the E-UTRAN. The RRC protocol layer is part of an LTE air interface control plane. The main services and functions provided by the RRC protocol layer include: the broadcast of system information related to the non-access stratum (NAS) and the access stratum (AS); paging; the establishment and release of an RRC connection between the UE and the e-UTRAN; the establishment, configuration, maintenance and release of point to point radio bearers, and QOS measurement reporting. The MME is responsible for the tracking and the paging of the UE in idle-mode. The MME is the termination point of the Non-Access Stratum (NAS). Additional features are also provided by the RRC protocol layer.

The establishment of an RRC connection between the UE and the EPC allows control information and data to be communicated between the UE and the MME using the control plane (comprising a signaling radio bearer between the UE and the eNB and an S1-MME bearer between the eNB and the MME). When a UE is in an RRC connected mode, a relatively large amount of power is consumed at the UE. Accordingly, the RRC connected time at the UE is minimized in order to maximize the operating time of a UE operating on a battery source. When it is not necessary or desired that a UE should maintain an RRC connected state with an EPS, then the UE can be moved to an RRC idle state, which can minimize power usage until it is desired to reestablish the RRC connected state. The UE can move from an RRC connected state to an RRC idle state by when an RRC connection release message is received from the eNB.

There is a careful balance between leaving a UE in an RRC connected state too long, which can result in excessive power drain at the UE, and tearing down an RRC connection too often, which can result in excessive signaling overhead within a wireless network, such as the EPS, and power usage at the UE to reestablish an RRC connection and associated radio bearers with the EPC.

The use of MTC devices can further exacerbate the challenges in optimizing the timing of an RRC connection between a UE operating as an MTC device and a wireless network, such as the EPS. An MTC device can be configured to operate with very low power consumption. Thus, the time the MTC device is in an RRC connected state is minimized to reduce power consumption. In addition, there can be thousands or tens of thousands of MTC devices that may attempt to connect to the network in a relatively brief amount of time.

For example, a UE operating as an MTC device may be connected to all of the power meters within a city. The meters can be configured to communicate power use at regular intervals, such as hourly, daily, weekly, or monthly. The connection of thousands or tens of thousands of MTC devices to a wireless network can result in significant signaling overhead at the E-UTRAN and the EPC. So it is important that each MTC device effectively communicates all necessary information with a minimum number of RRC connections and releases to reduce signaling overhead at the wireless network. This example is not intended to be limiting. A wide variety of operating conditions and reporting conditions can exist for UEs operating as MTC devices.

In accordance with an embodiment of the present invention, assistance information parameters can be communicated between an evolved packet system (EPS) and UEs to enhance the network's internal decisions and provide power savings and performance enhancements at the UE.

The assistance information parameters can be used at the network to provide load balancing control, resource allocation, and minimize signaling overhead. The assistance information parameters can include updates to parameters associated with the RRC connection release timer, RRC states, and state transition related constants and counters.

The assistance information parameters can be gathered by a UE, a radio access network (RAN), or at the EPC (i.e. the MME or HSS). The assistance information parameters can be stored at the eNB or the EPC. The assistance information parameters can be conveyed through different methods to benefit the UE and the network. For example, assistance information can be conveyed upon a request or query from the network, upon handover of a UE to a different eNB, upon re-establishment of an RRC connection from an RRC idle state, or when a UE conveys information due to an internal decision at the UE. In addition, the assistance information parameters can be used to adjust timing parameters on discontinuous reception (DRX) configurations for a UE. In times of lower activity or no activity, the eNB can activate a DRX mode so that the UE can power down its transceivers for some time defined by a set of timers.

RRC Release Assistance Information

When an RRC connection release message is communicated, a UE can be moved from an RRC connected mode to an RRC idle mode upon the expiration of a timer maintained at the eNB. The value, or parameter definition of this timer is typically operator or network specific. The value is not available in the 3GPP LTE Rel. 8, 9, 10, 11, 12 or 13 standard. Each operator uses a proprietary value for this timer and use the value as a means for differentiation with competing vendors. The timer is referred to as an "RRC inactivity timer" or an RRC connection release timer. The RRC connection release timer is different from other timers defined in the specification, such as the T320 timer.

The duration of the RRC connection release timer, which provides the time that the UE takes before releasing the UE connection with the EPC, can have a huge impact on UE power consumption. If the time period is too long, it can result in what is called a 'tail effect' during which time the UE is in connected mode but is not transmitting or receiving data. However, if the time period is too short, it can result in frequent RRC state transitions, which can result in high signaling overhead, as previously discussed.

In accordance with one embodiment of the present invention, a delta RRC release time can be configured. This delta RRC release time can be an assistance information parameter that can be used to enhance the network procedure for deciding when to release UE connections.

The delta RRC release time is a relative value of time ($\delta$) that can be added to a default instant that the eNB will release a UE's RRC connection. The value of the delta RRC release time can be positive or negative, thereby reducing or extending the default RRC release time. The delta RRC release time parameter can be generated by the eNB. The eNB is the node that determines when to release the RRC connection with the eNB in legacy systems. In one embodiment, the delta RRC release time value for each UE can be stored by the MME, along with a cell identification (ID). However, the decision of releasing the UE connection is not limited to the eNB. The decision of releasing the RRC connection for the UE can also be taken by other nodes. For example, the decision of releasing the RRC connection for a UE and the gathering of assistance information used to determine the delta RRC release time value may be performed by the UE or nodes in the EPC, such as the MME. This information can be used to determine an improved instance to release the connection that will minimize UE power usage and network traffic.

The delta RRC release time information can allow the eNB to define its own absolute RRC release time. In addition, the eNB can be configured to define its own mechanism to determine how and when to release a UE's RRC connection in a future instance. Intelligent eNBs can also be configured to consider additional factors such as the handover (HO) rate for a UE, a UE traffic pattern, or other internal algorithms at the eNB to determine when to release the RRC connection.

Figure 2:
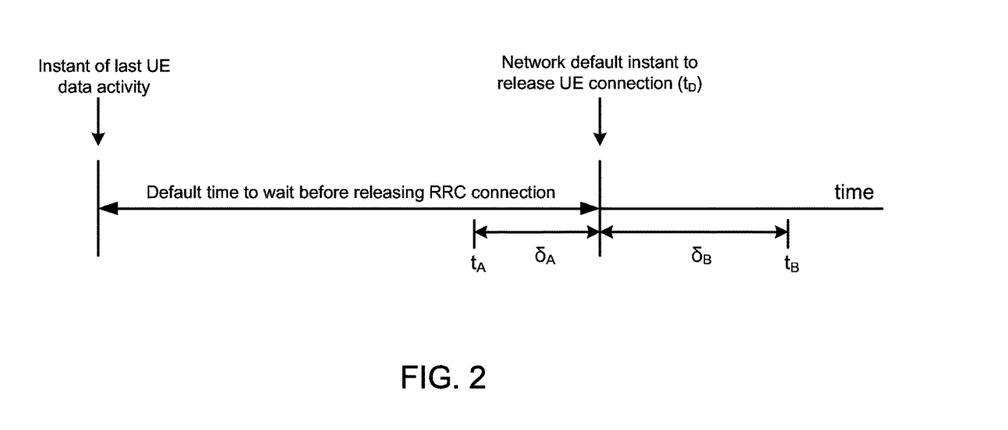
FIG. 2 illustrates a timeline showing history release information in accordance with an example.

For example, an eNB may define its internal constant RRC release time ($t_D$) to 5 seconds. A handover may be triggered for a UE that has already been without data activity for 3 seconds. At that point, the eNB can be configured to release the UE. Therefore, the delta RRC release time can be stored as being equal to negative two seconds ($\delta_A=-2$) by the MME, as illustrated in FIG. 2. The next time that the UE enters an RRC connected state, the eNB can also include the delta RRC release time value as a factor that can be used to assist in determining a time period in which to release the RRC connection to minimize network signaling and save UE power consumption and network resources.

Similarly, there can be cases when the eNB determines not to release the UE and to keep it connected for a longer period, in which case the relative value of the delta RRC release time is positive, illustrated as $\delta_B$ in FIG. 2.

In the case of an inter-eNB handover from a source eNB to a target eNB, the delta RRC release time can be communicated from the source eNB to the target eNB. The target eNB can then be configured to use this information to minimize network signaling and UE power consumption. In addition to communicating a delta RRC release time, additional information can also be communicated. For example, assistance information relating to a case in which a UE is kept in a connected mode without transiting to an idle mode may be communicated to the target eNB.

Assistance information such as the delta RRC release time can be used to understand the traffic activity based on the time that a UE spends in RRC connected mode and RRC idle mode. The specific details can be used by the network to reduce signaling overhead incurred due to frequent RRC state transitions.

In one example embodiment, information can be collected by one or more UEs and communicated by each UE to the EPC. A node in the EPC, such as the MME, can use the information to provide assistance information to the eNB to minimize the UE state transitions and achieve optimum network behavior. In another embodiment, the information can be collected by the MME itself.

For instance, a UE can convey, upon establishing an RRC connection, certain mobility related information. The mobility related information can include a list of cell ID and the time spent by the UE in each cell. The cell history can be kept for a predetermined amount of time, such as 60, 120, 240, or 480 seconds. The mobility information can be communicated to the EPC in other time instants. For instance, the eNB or MME may request the information.

The mobility related information, such as RRC state information, can be collected by the UEs and associated with selected cells for certain periods of time. In one example, the information can be collected as illustrated in the proceeding paragraphs.

The time spent by a UE in each state per cell can be represented as: {(cell_1, time_idle_1, time_connected_1), (cell_2, time_idle_2, time_connected_2), . . . , (cell_n, time_idle_n, time_connected_n)}, where cell—_x refers to cell_ID_x and/or cell_type_x; time_idle_x refers to the time that the UE was in an RRC idle state in Cell_x; and time_connected_x refers to the time that the UE is in an RRC connected state in Cell_x.

The time spent by a UE in each state without extrapolation can be represented as {(cell_1, time_RRCstate_1, RRCstate_1), (cell_2, time_RRCstate_2, RRCstate_2), . . . , (cell_n, time_RRCstate_n, RRCstate_n)} in which RRCstate_n represents the RRC state the UE is in. For example, RRC idle can be designated as 0 and RRC connected can be designated as 1.

The number of RRC state transitions per cell, with the time spent in each cell or the RRC state transition rate per cell, can be represented as: {(cell_1, time_cell_1, RRCstate_count_1), (cell_2, time_cell_2, RRCstate_count_2), . . . , (cell_n, time_cell_n, RRCstate_count_n)} or {(cell_1, RRCstate_ratio_1), (cell_2, RRCstate_ratio_2), . . . , (cell_n, RRCstate_ratio_n)}. Time_cell is the time spent in a given cell/eNB. RRCstate_count is the number of RRC_idle to RRC_connected state transitions performed by a UE while in the given cell. RRCstate_ratio is the ratio of time spent in RRC_idle to time spent in RRC_connected state, or vice versa.

In one embodiment, only the average and standard deviation (or variance) for the time spent by the UE in a cell is included. In this embodiment, the time spent by the UE in an RRC idle mode and the time spent by the UE in an RRC connected mode per cell can be represented as the number of RRC state transitions per cell over a certain period of time. For instance, the information collected can include: {(cell_1, average_time_idle_1, average_time_connected_1, std_time_idle_1, std_time_connected_1), etc., where average_time_idle_n is the average amount of time that the UE is in an RRC idle time in cell_n; std_time_idle_n is the standard deviation of the time the UE is in idle in cell_n; and average_time_connected_n is the average time the UE is in an RRC connected state in cell_n.

In one embodiment, the assistance information can include a history of RRC state transitions for a UE based on a weighted method. The node, such as the eNB or MME, that gathers raw information of RRC state transitions and the corresponding durations, can perform some form of weighting before sharing the information as assistance information. The weighting of the information can be done in different ways in addition to the exemplary methods. For example, weighting can be applied differently to the time spent that the UE spends in an RRC connected state and an RRC idle state over a window of time. Time base weighting can also be applied. The window can be either sliding or fixed.

The assistance information can also be decoupled from the UE cell history information (referring to the cell ID). Upon the request of the network, the UE can send the following information as different options: the assistance information only contains the time of stay and RRC state of each transition; or the assistance information can be the average and deviation (or variance) of the time that the UE has stayed in each cell over a window of time.

Conveying Assistance Information

In one embodiment, the UE can use an existing UE assistance information container to send the assistance information to convey the assistance information to the network, such as the MME in the EPC. In addition, a new message can be used to convey the assistance information to the network. In another example, the UE can communicate the UE assistance information to the eNB. The eNB may use the eNB configuration update or S1 setup request or any other appropriate S1 message to convey the information to the MME for storage.

In another embodiment, the UE can communicate UE assistance information when moving from an RRC idle state to an RRC connected state. The assistance information can also be communicated to the network or a target eNB at the event of a handover. For example, the information can be sent via an X2 connection from a serving eNB to a target eNB when the UE is handed over to another cell. The network can update the information and add the time of stay of the current cell information to a list, as previously discussed. If only average and standard deviation (or variance) information is sent to the network, the network, such as an element in the EPC, EPS, or an external element that is in communication with the EPC via the P-GW, the network can either re-calculate the average and standard deviation (or variance) based on the time the UE has stayed in the cell, or request the UE to update the information and send it to the network.

In one embodiment, if the information is decoupled with the UE history information that is sent to the eNB upon the UE's transition from RRC idle to RRRC connected, a new signaling can be added in the RRC message for the network to request such information.

Figure 3:
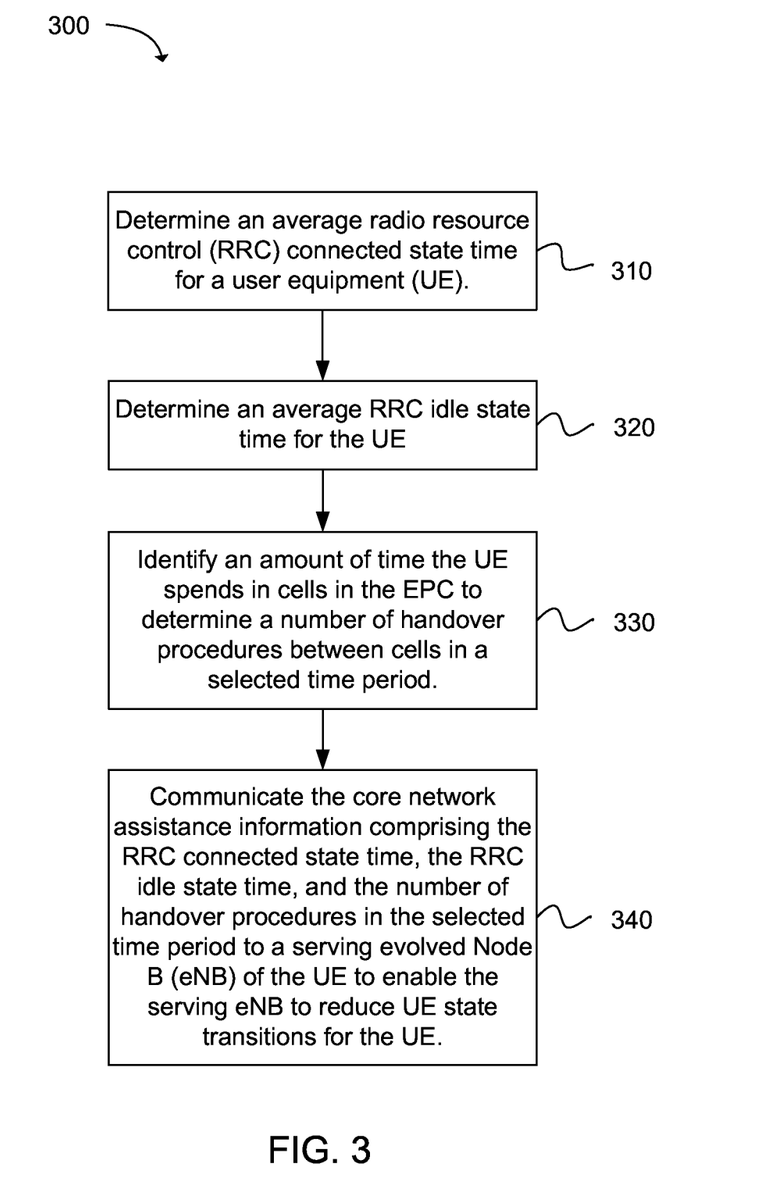
FIG. 3 illustrates a flow chart depicting functionality of a mobility management entity (MME) configured to provide core network assistance information in accordance with an example.

In accordance with one example, functionality 300 of a mobility management entity (MME) in an evolved packet core (EPC) that is configured to provide core network assistance information is disclosed, as shown in the flow chart of FIG. 3. The functionality can be implemented as a method or the functionality can be executed as instructions on a machine, where the instructions are included on at least one computer readable medium or one non-transitory machine readable storage medium. The MME can include one or more processors configured to: determine an average radio resource control (RRC) connected state time for a user equipment (UE), as shown in block 310; determine an average RRC idle state time for the UE, as shown in block 320; identify an amount of time the UE spends in cells in the EPC to determine a number of handover procedures between cells in a selected time period, as shown in block 330; and communicate the core network assistance information comprising the RRC connected state time, the RRC idle state time, and the number of handover procedures in the selected time period to a serving evolved Node B (eNB) of the UE to enable the serving eNB to reduce UE state transitions for the UE, as shown in block 340.

In another example, the core network assistance information can be communicated to the serving eNB via an S1 connection with the MME. The one or more processors can be further configured to communicate the core network assistance information to a target eNB at a handover of the UE to enable the target eNB to reduce UE state transitions for the UE. For example, the target eNB can reduce the number of times the UE transitions between an RRC connected state and an RRC idle state.

In another example, the one or more processors can be further configured to communicate, from the MME to the serving eNB, a time that the UE is in the RRC connected state. In addition, the one or more processors can be further configured to communicate, from the MME to the serving eNB, a time period that the UE is in the RRC idle state. the one or more processors can be further configured to communicate, from the MME to the serving eNB, an indication that the core network assistance information is based on statistical information collected at the MME.

Figure 4:
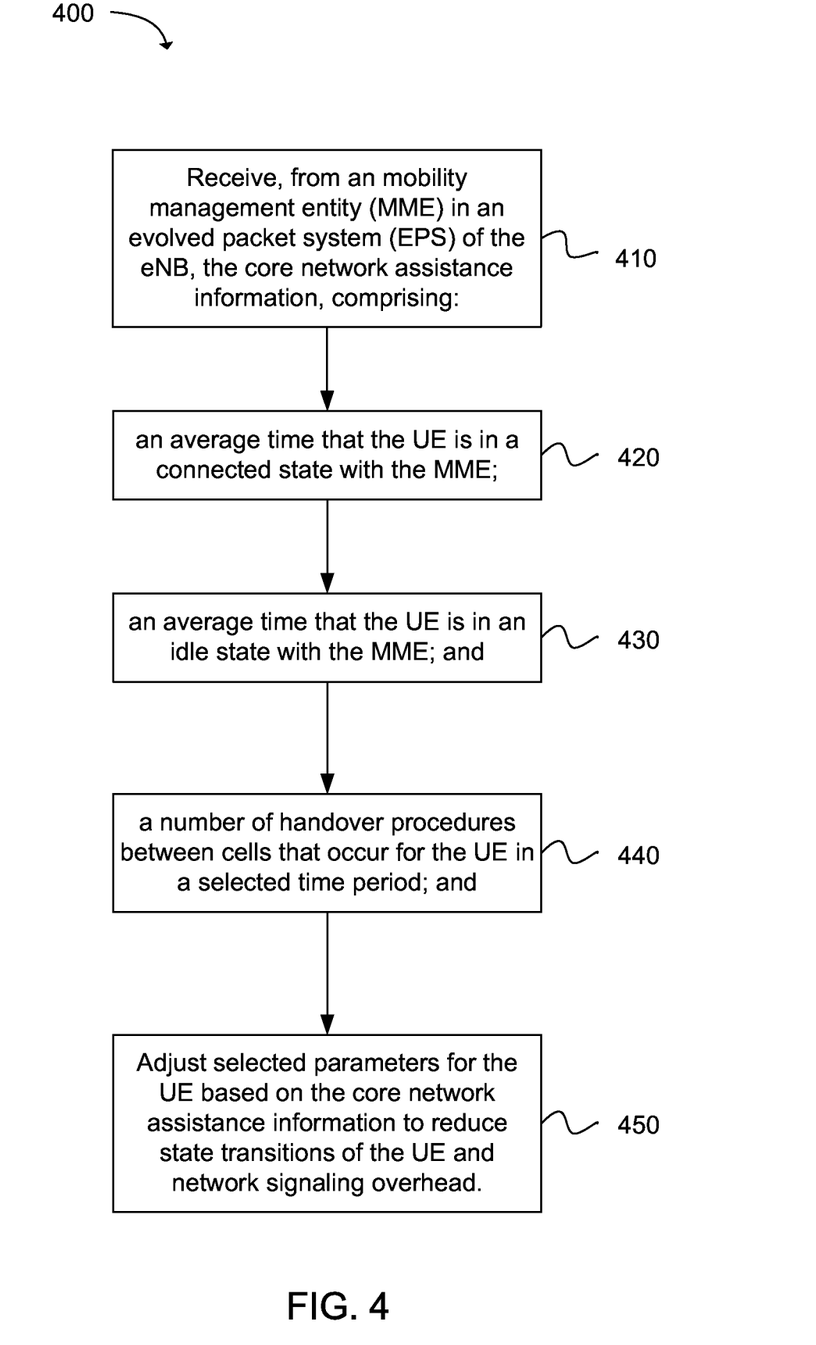
FIG. 4 illustrates a flow chart depicting functionality of an evolved Node B (eNB) configured to receive core network assistance information for a user equipment (UE) in accordance with an example.

Another example provides functionality 400 of an evolved Node B (eNB) configured to receive core network assistance information for a UE, as shown in the flow chart of FIG. 4. The functionality can be implemented as a method or the functionality can be executed as instructions on a machine, where the instructions are included on at least one computer readable medium or one non-transitory machine readable storage medium. The eNB can have one or more processors that are configured to receive, from a mobility management entity (MME) in an evolved packet system (EPS) of the eNB, the core network assistance information, as shown in block 410. The core network assistance information can include an average time that the UE is in a connected state with the MME, as shown in block 420; an average time that the UE is in an idle state with the MME, as shown in block 430; and a number of handover procedures between cells that occur for the UE in a selected time period, as shown in block 440. The one or more processors can be further configured to adjust selected parameters for the UE based on the core network assistance information to reduce state transitions of the UE and network signaling overhead, as shown in block 450.

In another example, the one or more processors of the UE can be further configured to receive the core network assistance information for a UE from the MME. The one or more processors of the UE can also be configured to communicate, via an X2 connection with a target eNB, the core network assistance information from the eNB to the target eNB at a handover of the UE to enable the target eNB to reduce UE state transitions for the UE.

The one or more processors can be further configured to receive, from the MME, an time interval between handover procedures for the UE. In addition, the one or more processors can be further configured to receive, from the MME a time period that the UE is in the connected state, wherein the connected state is a radio resource control (RRC) connected state; and a time period that the UE is in the idle state, wherein the idle state is a radio resource control (RRC) idle state. Also, the one or more processors of the eNB can be configured to receive, from the MME, an indication that the core network assistance information is based on statistical information collected at the MME.

Figure 5:
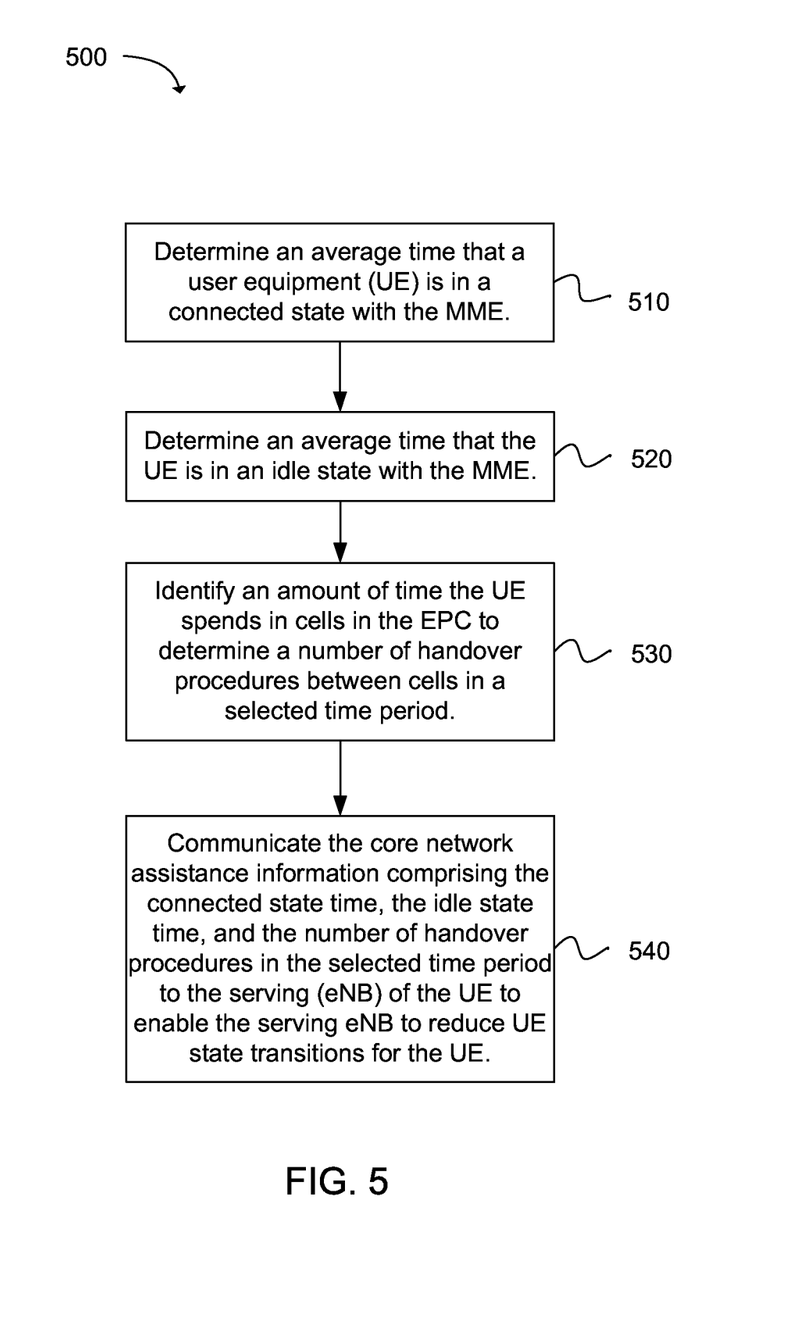
FIG. 5 depicts a flowchart of a method for providing core network assistance information from a MME in an evolved packet core (EPC) to a serving eNB in accordance with an example.

Another example provides a non-transitory machine readable storage medium having instructions embodied thereon, the instructions which when executed by one or more processors perform the following operations to provide core network assistance information from a mobility management entity (MME) in an evolved packet core (EPC) to a serving evolved Node B (eNB), as shown in the flow chart of FIG. 5. The operations comprise: determine an average time that a user equipment (UE) is in a connected state with the MME, as shown in block 510; determine an average time that the UE is in an idle state with the MME, as shown in block 520; identify an amount of time the UE spends in cells in the EPC to determine a number of handover procedures between cells in a selected time period, as shown in block 530; and communicate the core network assistance information comprising the connected state time, the idle state time, and the number of handover procedures in the selected time period to the serving (eNB) of the UE to enable the serving eNB to reduce UE state transitions for the UE, as shown in block 540.

Further instructions for the at least one non-transitory machine readable storage medium comprise communicating the core network assistance information to the serving eNB via an S1 connection with the MME; and communicating the core network assistance information to a target eNB at a handover of the UE to enable the target eNB to reduce UE state transitions for the UE. The state transitions for the UE can include transitions between an RRC connected state and an RRC idle state, as previously discussed. The instructions can be executed by the one or more processors.

Further instructions for the at least one non-transitory machine readable storage medium comprise: communicating, from the MME to the serving eNB, a time interval between handover procedures for the UE; communicating, from the MME to the serving eNB, a time period that the UE will be in the connected state, wherein the connected state is a radio resource control (RRC) connected state; and communicate, from the MME to the serving eNB, a time period that the UE is in the idle state, wherein the idle state is a radio resource control (RRC) idle state. The instructions can further comprise communicating, from the MME to the serving eNB, an indication that the core network assistance information is based on statistical information collected at the MME. The instructions can be executed by the one or more processors.

Figure 6:
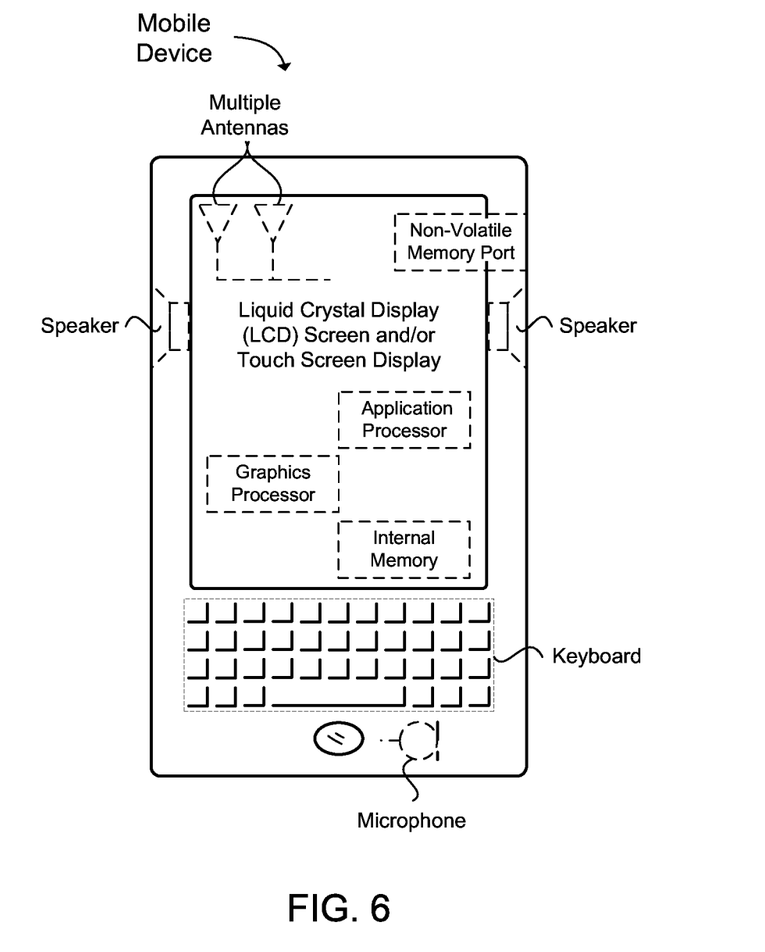
FIG. 6 illustrates a diagram of a wireless device (e.g., UE) in accordance with an example.

FIG. 6 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 6 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits can be used to implement the functional units described in this specification. For example, a first hardware circuit can be used to perform processing operations and a second hardware circuit (e.g., a transceiver) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A mobility management entity (MME) configured to provide core network assistance information, the MME having one or more processors configured to:
   determine an average connected state time for a user equipment (UE) with the MME;
   determine an average idle state time for the UE with the MME;
   identify an amount of time the UE spends in cells associated with an evolved packet core (EPC) for the MME to determine a number of handover procedures between cells in a selected time period;
   communicate the core network assistance information comprising the average connected state time, the average idle state time, and the number of handover procedures in the selected time period to an evolved Node B (eNB) of the UE.

2. The MME of claim 1, wherein the core network assistance information is communicated to the eNB via an S1 connection with the MIME.

3. The MME of claim 1, wherein the one or more processors are further configured to communicate the core network assistance information to a target eNB at a handover of the UE to enable the target eNB to reduce UE state transitions for the UE.

4. The MME of claim 1, wherein the one or more processors are further configured to communicate, from the MME to the eNB, a time interval between handover procedures for the UE.

5. The MME of claim 1, wherein the one or more processors are further configured to communicate, from the MIME to the eNB, a time period that the UE is in the connected state.

6. The MME of claim 1, wherein the one or more processors are further configured to communicate, from the MME to the eNB, a time period the UE is in the idle state.

7. The MME of claim 1, wherein the one or more processors are further configured to communicate, from the MME to the eNB, an indication that the core network assistance information is based on statistical information collected at the MME.

8. An evolved Node B (eNB) configured to receive core network assistance information for a user equipment (UE), the eNB having one or more processors configured to:
   receive, from a mobility management entity (MME) in an evolved packet system (EPS) of the eNB, the core network assistance information, comprising:
      an average time that the UE is in a connected state with the MME;
      an average time that the UE is in an idle state with the MME; and
      a number of handover procedures between cells that occur for the UE in a selected time period; and
   adjust selected parameters for the UE based on the core network assistance information to reduce state transitions of the UE and network signaling overhead, including to determine a delta radio resource control (RRC) release time based on a difference between a default time to wait for releasing an RRC connection with a UE and an actual release time for releasing the RRC connection with the UE.

9. The eNB of claim 8, having one or more processors further configured to receive the core network assistance information for a UE from the MME.

10. The eNB of claim 8, having one or more processors further configured to communicate, via an X2 connection with a target eNB, the core network assistance information from the eNB to the target eNB at a handover of the UE to enable the target eNB to reduce UE state transitions for the UE.

11. The eNB of claim 8, having one or more processors further configured to receive, from the MME, a time interval between handover procedures for the UE.

12. The eNB of claim 8, having one or more processors further configured to receive, from the MME, a time period the UE is in the connected state, wherein the connected state is a radio resource control (RRC) connected state.

13. The eNB of claim 8, having one or more processors further configured to receive, from the MME, a time period the UE is in the idle state, wherein the idle state is a radio resource control (RRC) idle state.

14. The eNB of claim 8, having one or more processors further configured to receive, from the MME, an indication that the core network assistance information is based on statistical information collected at the MME.

15. The eNB of claim 8, having one or more processors further configured to add the delta RRC release time to the default time to wait for releasing the RRC connection with the UE to adjust the default time to reduce power usage at the UE or reduce network traffic.

16. The eNB of claim 8, having one or more processors further configured to communicate the delta RRC release time to a mobile management entity (MME) for storage.

17. The eNB of claim 8, having one or more processors further configured to communicate, via an X2 connection, a delta radio resource control (RRC) time from the eNB to a target eNB at a handover of a UE.

18. At least one non-transitory machine readable storage medium having instructions embodied thereon, the instructions which when executed by one or more processors perform the following operations to provide core network assistance information from a mobility management entity (MME) to an evolved Node B (eNB), the operations comprising:
   determine an average time that a user equipment (UE) is in a connected state with the MME;
   determine an average time that the UE is in an idle state with the MME;
   identify an amount of time the UE spends in cells in an evolved packet core (EPC) to determine a number of handover procedures between cells in a selected time period;
   communicate, via an S1-MME bearer, the core network assistance information from the MME to the eNB, the assistance information comprising the connected state time, the idle state time, and the number of handover procedures in the selected time period to the eNB of the UE; and
   receive at the MME, from the eNB, a delta radio resource control (RRC) release time value for one or more UEs.

19. The at least one non-transitory machine readable storage medium of claim 18, further comprising instructions which when executed by the one or more processors communicate the core network assistance information to the eNB via an S1 connection with the MME.

20. The at least one non-transitory machine readable storage medium of claim 18, further comprising instructions which when executed by the one or more processors communicate the core network assistance information to a target eNB at a handover of the UE to enable the target eNB to reduce UE state transitions for the UE.

21. The at least one non-transitory machine readable storage medium of claim 18, further comprising instructions which when executed by the one or more processors communicate, from the MME to the eNB, a time interval between handover procedures for the UE.

22. The at least one non-transitory machine readable storage medium of claim 18, further comprising instructions which when executed by the one or more processors communicate, from the MME to the eNB, a time the UE is in the connected state, wherein the connected state is a radio resource control (RRC) connected state.

23. The at least one non-transitory machine readable storage medium of claim 18, further comprising instructions which when executed by the one or more processors communicate, from the MME to the eNB, a time period the UE is in the idle state, wherein the idle state is a radio resource control (RRC) idle state.

24. The at least one non-transitory machine readable storage medium of claim 18, further comprising instructions which when executed by the one or more processors, communicate from the MME to the eNB, an indication that the core network assistance information is based on statistical information collected at the MME.

25. The at least one non-transitory machine readable storage medium of claim 18, further comprising instructions which when executed by the one or more processors, associate each delta RRC release time value with a cell identification.

26. The at least one non-transitory machine readable storage medium of claim 18, further comprising instructions which when executed by the one or more processors, communicate the delta RRC release time for a serving eNB from the MME to a target eNB at a handover of a UE.

27. At least one non-transitory machine readable storage medium having instructions embodied thereon, the instructions which when executed by one or more processors perform the following operations to receive core network assistance information for a user equipment (UE) at an evolved Node B (eNB), the operations comprising:
   determine an average time that a user equipment (UE) is in a connected state with the MME;
   determine an average time that the UE is in an idle state with the MME;
   identify an amount of time the UE spends in cells in the EPC to determine a number of handover procedures between cells in a selected time period; and
   communicate the core network assistance information comprising the connected state time, the idle state time, and the number of handover procedures in the selected time period to the eNB of the UE to reduce state transitions of the UE and network signaling overhead based on the core network assistance information, including to determine a delta radio resource control (RRC) release time based on a difference between a default time to wait for releasing an RRC connection with a UE and an actual release time for releasing the RRC connection with the UE.

28. The at least one non-transitory machine readable storage medium of claim 27, further comprising instructions which when executed by the one or more processors receive the core network assistance information to the eNB via an S1 connection with the MME.

* * * * *